United States Patent [19]
Choi

[11] Patent Number: 5,249,006
[45] Date of Patent: Sep. 28, 1993

[54] HIGH POWER MAGNIFYING PROJECTOR

[75] Inventor: Soon C. Choi, Suweon, Rep. of Korea

[73] Assignee: Samsung Electronics Co., Ltd., Paldal, Rep. of Korea

[21] Appl. No.: 877,236

[22] Filed: May 1, 1992

[30] Foreign Application Priority Data

May 8, 1991 [KR] Rep. of Korea .............. 91-7414

[51] Int. Cl.[5] .............................................. G03B 21/28
[52] U.S. Cl. ..................................... 353/122; 353/99; 353/37
[58] Field of Search .................. 353/122, 94, 98, 99, 353/30, 29, 37, DIG. 3, DIG. 4; 359/48, 36

[56] References Cited

U.S. PATENT DOCUMENTS

| | | | |
|---|---|---|---|
| 3,421,815 | 1/1969 | Douitz | 353/99 |
| 4,519,682 | 5/1985 | Mast et al. | 353/122 |
| 4,552,441 | 11/1985 | Dewey | 353/94 |

*Primary Examiner*—William A. Cuchlinkski, Jr.
*Assistant Examiner*—William C. Dowling
*Attorney, Agent, or Firm*—Robert E. Bushnell

[57] ABSTRACT

The present disclosure describes a high power magnifying projector using a liquid crystal light valve. The projector comprises a light source for illuminating the object, a light source for projecting an image of the object in the screen, a plurality of condensing lenses, at least one selecting mirror located at the above one of the condensing lenses, a plurality of whole reflecting mirrors, an object lens secured above part of support plate, a semi-transmitting mirror secured above the object lens at an inclined angle, a liquid crystal light valve for changing and converting the direction of a particle array in accordance with the brightness of light applied thereto, and a beam splitter secured between the liquid crystal light valve and the screen, wherein the light for illuminating the object and the light for projecting the image of the object in the screen are separately used so that the projector can optionally adjust and observe the size of the object so as to magnify and project an image of a minute object.

6 Claims, 1 Drawing Sheet

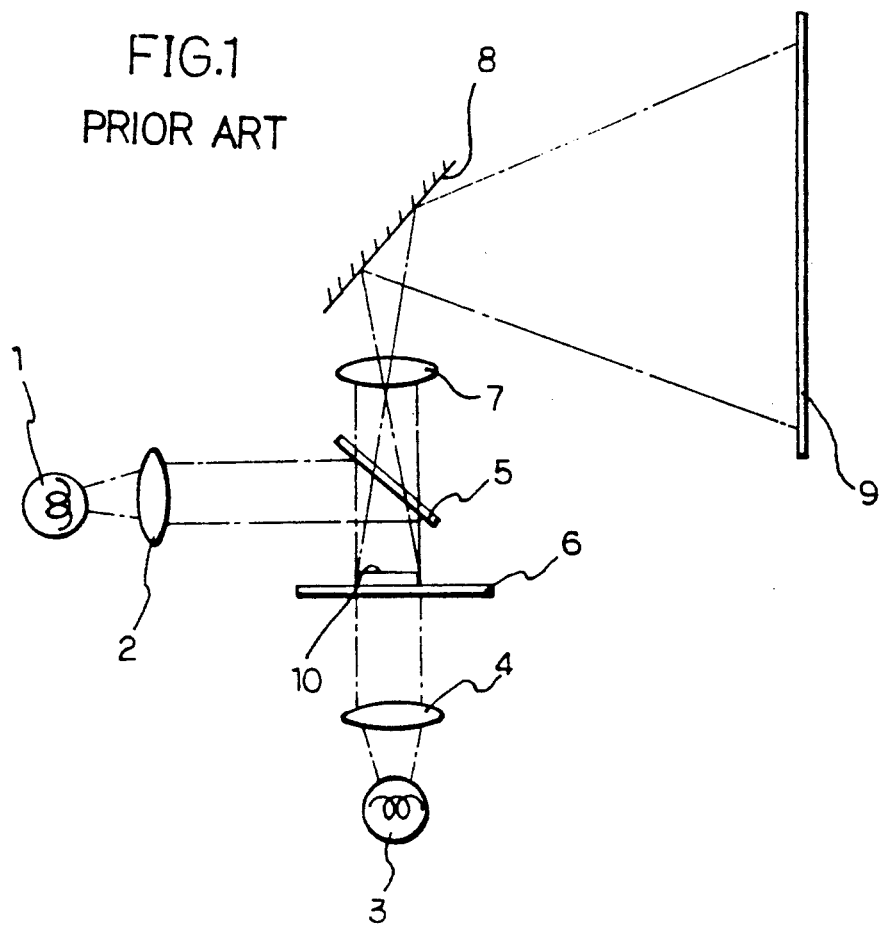
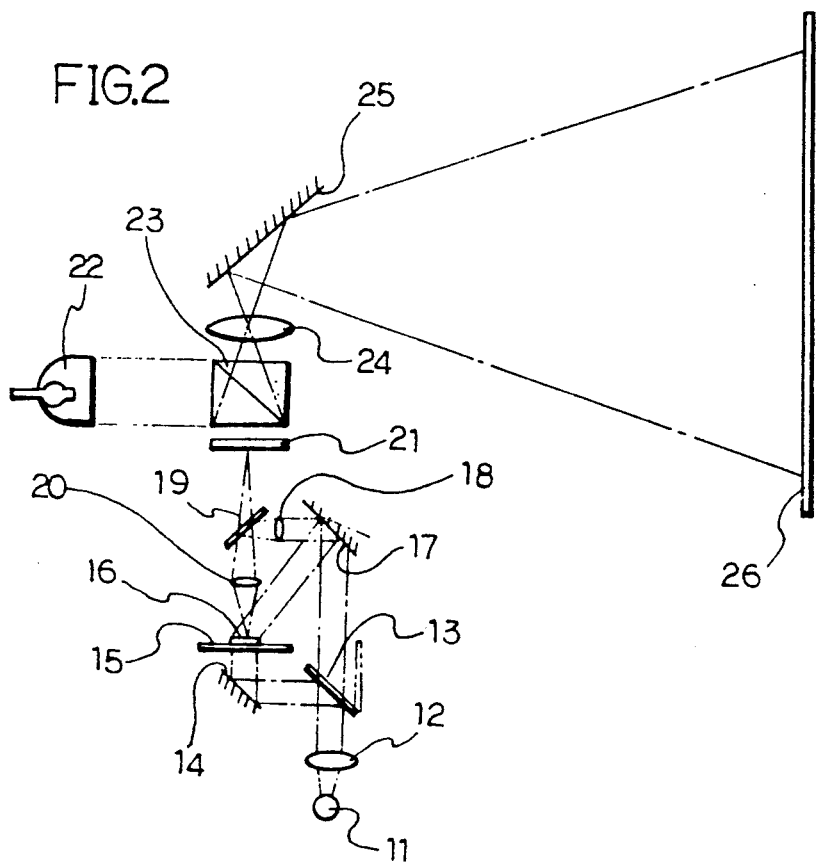

HIGH POWER MAGNIFYING PROJECTOR

BACKGROUND OF THE INVENTION

This invention relates to a high power magnifying projector using a liquid crystal light valve, and in particular to, a projector for optionally adjusting and observing the size of an object, so as to magnify and project a minute object.

A prior-art projector, as shown in FIG. 1, is formed in such a way that a reflecting type lighting source 1 and a transmitting type lighting source 3 are located to provide light at right angles to each other, condensing lenses 2 and 4 for making a proper parallel light in response to the light of the lighting sources 1 and 3, respectfully, are secured in front of the lighting sources, a support plate 6 for securing an object 10 to be observed is provided above the upper part of condensing lens 4, semi-transmitting mirror 5 for the purpose of reflecting the light from lighting source 1 to the object 10 is provided above part of the support plate 6.

In the transmitting observation of the projector, the light formed from the lighting source 3 illuminates the object 10 through the condensing lens 4, and about 50 percent of the light is transmitted through the semi-transmitting mirror 5, and the remainder of the light is reflected by the mirror 5 and disappears into space.

In the reflecting observation of the projector, the light formed from the lighting source 1 also illuminates the object 10, through the condensing lens 2, where the light is transmitted through the semi-transmitting mirror 5 at about 50 percent of the amount of the light, and the remainder of the light is reflected and disappears into space.

The semi-transmitting mirror 5 passes about 50 percent of the light reflected from the object 10 and directs it towards the transmitting lens 7, the remaining percentage of light is reflected into space.

The light through inclined semi-transmitting mirror 5 provides an enlarged image on the screen 9, wherein the reflected light is transmitted through the transmitting lens 7, reflected by reflecting mirror 8 and projected on the screen 9.

In the conventional projector, in a case of magnifying the image, the image is not clear because the light through the semi-transmitting mirror 5 is directly injected on the screen through the transmitting lens 7. Also, in order to select the transmitting lens having an enlarged function of high power, the conventional projector cannot avoid increasing the price, and complicating the design. Further, magnification of the projector will not permit enlargement to 200%.

SUMMARY OF THE INVENTION

Accordingly, in order to overcome the above described disadvantages, it is an object of the present invention to achieve the high power magnifying projector, which clearly observes the object, enlarges the image of the object at a high power and has an accuracy not available in the conventional projector.

It is also an object of the present invention to provide a high power magnifying projector for optionally adjusting and observing the size of the object, thereby using a liquid crystal light valve.

In order to achieve the objects, a high power magnifying projector which provides the image with high power on the screen, thereby magnifying the image reflected, comprises a light source for illuminating the object, a light source for projecting the object in the screen, a plurality of condensing lenses, at least one selecting mirror located above the upper portion of one of the condensing lenses, a plurality of whole reflecting mirrors, an object lens secured above part of support plate, a semi-transmitting mirror secured above the upper portion of the object lens and having an inclined angle, a liquid crystal light valve for changing and converting the direction of a particle array in accordance with the brightness of an applied light, and a beam splitter secured above the liquid crystal light valve.

BRIEF DESCRIPTION OF THE DRAWINGS

This invention may be better understood and its numerous objects and advantages will become apparent to those skilled in the art by reference to the accompanying drawings as follows:

FIG. 1 is a schematic view showing a prior-art high power magnifying projector, and FIG. 2 is a schematic view showing a high power magnifying projector of this invention.

DETAILED DESCRIPTION OF THE PREFERRED EMBODIMENT

The present invention will now be described with reference to FIG. 2.

At first, the arrangement and the operation of the projector will be described. A condensing lens 12 and a selecting mirror 13, which is optionally moved into and out of the light path of the light from light source 11 at a predetermined angle, are secured in front of the light source 11. The light emitted from the light source 11 is provided to the selecting mirror 13 in parallel form by the condensing lens 12.

At this time, if the selecting mirror is selected to be in the light path, the light reflected by the selecting mirror 13 is then reflected by the whole reflecting mirror 14 through the support plate 15 to illuminate the object 16 on the support plate 15.

On the contrary, if the selecting mirror is not selected to be in the light path, the light from light source 11 reaches a whole reflecting mirror 17 through the condensing lens 12, the light may be used to directly illuminate the object on the support plate or the light may be passed through a condensing lens 18 to a semi-transmitting mirror 19 positioned above the object 16. The light reflected by the semi-transmitting mirror 19 is passed through an object lens 20 to the object 16.

And again, the light illuminating and reflected from the object 16 is passed through the object lens 20 and the semi-transmitting mirror 19 to a liquid crystal light valve 21, which focuses and enlarges the images. The liquid crystal light valve has a function which changes and converts the direction of a particle array in accordance with a brightness degree of applied light.

Also, a beam splitter is located above the liquid crystal light valve. The light emitted by a transmitting light source 22 is converted into a linear polarized light through the beam splitter 23. The polarized light illuminates and reflected in the liquid crystal light valve. The light illuminated in the liquid crystal light valve 21 is modulated to a polarized direction in accordance with an array direction of a liquid crystal molecule by transmitting and reflecting the light in the liquid crystal light valve 21.

The modulated light is able to change its transmissivity according to the modulation extent of the light passing through the beam splitter. Also, the light is provided for only supplying an enlarged and projected image on the screen 26 by magnifying the light in the projecting lens 24 and by reflecting the light by the whole reflecting mirror 25.

In the embodiments of this invention described above, the high power magnifying projector uses a liquid crystal light valve with a light source to separate the light for illuminating the object from the light for projecting the image in the screen. The light for illuminating the object has only a sufficient supply of the light in order for the object to be sensed. More light than the light for illuminating the object is used for projecting the image in the screen. Thus the projector can provide an image of the object magnified with a high power to the screen. Also, the selecting mirror is optionally adjusted in the range of the predetermined angle.

Furthermore, since the projection device uses the light from only one illuminating light source to protect the image of an object on a screen, the projector is a very simple construction, thereby ensuring that it may readily be noticed by automated mass production.

What is claimed is:

1. A high power magnifying projector for providing magnified images of an object on a screen, comprising:
    first light source means for providing light in a direction of a first path;
    a selecting mirror disposed to reflect said light of the first path in direction of a second path when selectively placed at a predetermined angle in the first path of said light;
    a first reflective mirror disposed to reflect the light in the second path in a direction of a third path to illuminate said object;
    a second reflective mirror disposed to reflect the light in said first path, when said selecting mirror is not selectively placed in said first path, in a direction of a fourth path;
    a semi-transmitting mirror positioned to receive light in said fourth path from said second reflective mirror to apply said light to said object through an object lens;
    liquid crystal light valve means for receiving reflected light from said object, said reflected light passing through said object lens and said semi-transmitting mirror, for controlling image enlargement and focus;
    beam splitting means for receiving and polarizing light from a second light source means and for reflecting polarized light from said second light source to said liquid crystal light valve, said beam splitter passing polarized reflected light from said liquid crystal light valve;
    a projecting lens positioned to magnify said polarized reflected light passed by said beam splitter; and
    a third reflective mirror for receiving and reflecting said magnified polarized reflected light from said projecting lens to said screen.

2. The high power magnifying projector as claimed in claim 1, wherein said first light source means comprises:
    a first light source providing said light in said first path; and
    a first condensing lens positioned between said first light source and said selecting mirror.

3. The high power magnifying projector as claimed in claim 1, further comprising a condensing lens in positioned in said fourth path between said semi-transmitting mirror and said second reflective mirror.

4. The high power magnifying projector as claimed in claim 2, further comprising a second condensing lens in positioned in said fourth path between said semi-transmitting mirror and said second reflective mirror.

5. A high power magnifying projector for providing magnified images of an object on a screen, comprising:
    first light source means for providing light in a direction of a first path;
    a selecting mirror disposed to reflect said light of the first path in direction of a second path when selectively placed at a predetermined angle in the first path of said light;
    a first reflective mirror disposed to reflect the light in the second path in a direction of a third path for illuminating said object;
    a second reflective mirror disposed to reflect the light in said first path, when said selecting mirror is not selectively placed in said first path, in a direction of a fourth path for illuminating said object;
    a semi-transmitting mirror disposed to receive light from said object through an object lens;
    liquid crystal light valve means for receiving reflected light from said object, said reflected light passing through said object lens and said semi-transmitting mirror, for controlling image enlargement and focus;
    beam splitting means for receiving and polarizing light from a second light source means and for reflecting polarized light from said second light source to said liquid crystal light valve, said beam splitter passing polarized reflected light from said liquid crystal light valve;
    a projecting lens positioned to magnify said polarized reflected light passed by said beam splitter; and
    a third reflective mirror disposed to reflect said magnified polarized reflected light from said projecting lens to said screen.

6. The high power magnifying projector as claimed in claim 5, wherein said first light source means comprises:
    a first light source for providing said light in said first path; and
    a condensing lens positioned between said first light source and said selecting mirror.

* * * * *

UNITED STATES PATENT AND TRADEMARK OFFICE
CERTIFICATE OF CORRECTION

PATENT NO. : 5,249,006
DATED : September 28, 1993
INVENTOR(S) : Soon-Cheol CHOI

It is certified that error appears in the above-indentified patent and that said Letters Patent is hereby corrected as shown below:

On the title page:

Item: [75], inventor's name, change "Soon C. Choi" to --Soon Cheol CHOI--

Signed and Sealed this

Tenth Day of September, 1996

Attest:

BRUCE LEHMAN

*Attesting Officer*          *Commissioner of Patents and Trademarks*